United States Patent
Suzuki et al.

(10) Patent No.: US 10,311,718 B2
(45) Date of Patent: Jun. 4, 2019

(54) IMAGE DISPLAY DEVICE FOR DISPLAYING IMAGES ON A ROAD SURFACE

(71) Applicant: SUBARU CORPORATION, Tokyo (JP)

(72) Inventors: Dan Suzuki, Tokyo (JP); Makoto Kinoshita, Tokyo (JP); Toru Yamazumi, Tokyo (JP); Kentarou Yamasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/877,901

(22) Filed: Jan. 23, 2018

(65) Prior Publication Data

US 2018/0261081 A1    Sep. 13, 2018

(30) Foreign Application Priority Data

Mar. 10, 2017 (JP) .................................. 2017-046052

(51) Int. Cl.
*G08G 1/005* (2006.01)
*G08G 1/16* (2006.01)
(Continued)

(52) U.S. Cl.
CPC ............... *G08G 1/005* (2013.01); *B60Q 1/50* (2013.01); *B60Q 9/008* (2013.01); *G08G 1/162* (2013.01); *B60Q 2400/50* (2013.01)

(58) Field of Classification Search
CPC .......... G08G 1/005; G08G 1/162; B60Q 9/08; B60Q 1/50; B60Q 2400/50
(Continued)

(56) References Cited

U.S. PATENT DOCUMENTS

| 5,654,705 A | 8/1997 | Houten et al. |
| 6,662,108 B2 * | 12/2003 | Miller .................... G08G 1/164 340/435 |

(Continued)

FOREIGN PATENT DOCUMENTS

| EP | 2233356 A1 | 9/2010 |
| JP | 11-263145 A | 9/1999 |

(Continued)

OTHER PUBLICATIONS

Japanese Office Action issued in corresponding Japanese Patent Application No. 2017-046052, dated Sep. 11, 2018, with English Translation.

(Continued)

*Primary Examiner* — Eric Blount
(74) *Attorney, Agent, or Firm* — McDermott Will & Emery LLP

(57) ABSTRACT

An image display device includes an illuminator and a communicator. The illuminator is configured to send out light on a road surface around a first vehicle as an own vehicle, to display a first notification image on the road surface. The first notification image notifies information to surroundings of the first vehicle. The communicator is configured to perform inter-vehicle communication with a second vehicle other than the first vehicle. The illuminator is configured to display the first notification image on the basis of the inter-vehicle communication performed by the communicator.

15 Claims, 11 Drawing Sheets

(51) Int. Cl.
  *B60Q 9/00* (2006.01)
  *B60Q 1/50* (2006.01)
(58) Field of Classification Search
  USPC .............................. 340/944, 435, 468, 436
  See application file for complete search history.

(56) References Cited

U.S. PATENT DOCUMENTS

| | | | |
|---|---|---|---|
| 8,269,652 | B2 | 9/2012 | Seder et al. |
| 8,954,252 | B1 | 2/2015 | Urmson et al. |
| 8,996,224 | B1 | 3/2015 | Herbach et al. |
| 9,135,754 | B2 | 9/2015 | Ng-Thow-Hing et al. |
| 9,475,422 | B2 * | 10/2016 | Hillis ............... B60Q 1/26 |
| 9,558,409 | B2 | 1/2017 | Pliefke et al. |
| 9,575,176 | B2 | 2/2017 | Baba |
| 9,654,738 | B1 | 5/2017 | Ferguson et al. |
| 9,849,784 | B1 | 12/2017 | Chan et al. |
| 9,896,107 | B1 * | 2/2018 | Huang ............ B60W 30/18163 |
| 9,902,311 | B2 * | 2/2018 | Sweeney ............ B60Q 1/2611 |
| 9,905,132 | B2 | 2/2018 | Habu |
| 9,925,989 | B2 | 3/2018 | Lee |
| 9,947,221 | B1 | 4/2018 | Mazzola |
| 9,952,054 | B2 | 4/2018 | An et al. |
| 9,969,326 | B2 * | 5/2018 | Ross ............... B60Q 1/50 |
| 9,978,280 | B2 * | 5/2018 | Lee ............... G08G 1/166 |
| 9,988,047 | B2 | 6/2018 | Johnson et al. |
| 10,048,688 | B2 | 8/2018 | Ramasamy |
| 10,089,537 | B2 | 10/2018 | Nix et al. |
| 2002/0140555 | A1 | 10/2002 | Jette et al. |
| 2005/0278098 | A1 | 12/2005 | Breed |
| 2006/0055525 | A1 | 3/2006 | Kubota et al. |
| 2007/0067081 | A1 | 3/2007 | Ton |
| 2008/0040004 | A1 | 2/2008 | Breed |
| 2008/0175012 | A1 | 7/2008 | Shimaoka et al. |
| 2008/0243389 | A1 | 10/2008 | Inoue et al. |
| 2008/0312832 | A1 | 12/2008 | Greene et al. |
| 2008/0312833 | A1 | 12/2008 | Greene et al. |
| 2009/0160678 | A1 | 6/2009 | Turnbull |
| 2010/0030474 | A1 | 2/2010 | Sawada |
| 2010/0082251 | A1 | 4/2010 | Kogure |
| 2011/0128139 | A1 | 6/2011 | Tauchi et al. |
| 2011/0184617 | A1 | 7/2011 | Hegemann et al. |
| 2012/0140988 | A1 | 6/2012 | Takahashi |
| 2012/0194356 | A1 | 8/2012 | Haines et al. |
| 2012/0224060 | A1 | 9/2012 | Gurevich et al. |
| 2013/0057690 | A1 | 3/2013 | Mitsugi |
| 2014/0062685 | A1 | 3/2014 | Tamatsu et al. |
| 2014/0152488 | A1 | 6/2014 | Baba |
| 2015/0103174 | A1 | 4/2015 | Emura et al. |
| 2015/0179073 | A1 | 6/2015 | Suzuno |
| 2015/0194082 | A1 | 7/2015 | McEwan |
| 2015/0334269 | A1 | 11/2015 | Yokota et al. |
| 2016/0039286 | A1 * | 2/2016 | Shibata ............ B60K 35/00 701/36 |
| 2016/0093207 | A1 | 3/2016 | Di Censo et al. |
| 2016/0115650 | A1 | 4/2016 | Leung |
| 2016/0247393 | A1 | 8/2016 | Okamoto et al. |
| 2016/0332568 | A1 | 11/2016 | Kim |
| 2017/0043705 | A1 | 2/2017 | Mizuno |
| 2017/0140651 | A1 * | 5/2017 | Lee ............... G08G 1/166 |
| 2017/0182934 | A1 | 6/2017 | Arita et al. |
| 2017/0210283 | A1 | 7/2017 | Ishida |
| 2017/0217361 | A1 | 8/2017 | Miller |
| 2017/0217368 | A1 | 8/2017 | Lewis et al. |
| 2017/0217422 | A1 | 8/2017 | Nakamura |
| 2017/0240096 | A1 * | 8/2017 | Ross ............... B60Q 1/50 |
| 2017/0253177 | A1 | 9/2017 | Kawamata et al. |
| 2017/0253181 | A1 | 9/2017 | Choi et al. |
| 2017/0259734 | A1 | 9/2017 | Imaishi et al. |
| 2017/0276308 | A1 | 9/2017 | Nakazawa et al. |
| 2017/0330463 | A1 | 11/2017 | Li et al. |
| 2017/0337821 | A1 | 11/2017 | Masuda et al. |
| 2017/0372613 | A1 | 12/2017 | Habu |
| 2018/0009374 | A1 | 1/2018 | Kim et al. |
| 2018/0024562 | A1 | 1/2018 | Bellaiche |
| 2018/0025235 | A1 | 1/2018 | Fridman |
| 2018/0033306 | A1 | 2/2018 | Kim et al. |
| 2018/0086346 | A1 | 3/2018 | Fujisawa et al. |
| 2018/0118099 | A1 | 5/2018 | Kunii et al. |
| 2018/0118106 | A1 | 5/2018 | You et al. |
| 2018/0134286 | A1 | 5/2018 | Yi et al. |
| 2018/0141484 | A1 | 5/2018 | Haneda et al. |
| 2018/0173234 | A1 | 6/2018 | Van Laack et al. |
| 2018/0173237 | A1 | 6/2018 | Reiley et al. |
| 2018/0218601 | A1 | 8/2018 | Aoki et al. |
| 2018/0247540 | A1 | 8/2018 | Hagawa et al. |
| 2018/0250596 | A1 | 9/2018 | Kim |
| 2018/0253609 | A1 | 9/2018 | Potter et al. |
| 2018/0257547 | A1 | 9/2018 | Suzuki et al. |
| 2018/0257549 | A1 | 9/2018 | Suzuki et al. |
| 2018/0257550 | A1 | 9/2018 | Suzuki et al. |
| 2018/0261080 | A1 | 9/2018 | Suzuki et al. |
| 2018/0261081 | A1 | 9/2018 | Suzuki et al. |

FOREIGN PATENT DOCUMENTS

| | | |
|---|---|---|
| JP | 2006-252264 A | 9/2006 |
| JP | 2008-007079 A | 1/2008 |
| JP | 2008-143510 A | 6/2008 |
| JP | 2009-149152 A | 7/2009 |
| JP | 2009-230701 | 10/2009 |
| JP | 4720650 B2 | 7/2011 |
| JP | 2013-203251 | 10/2013 |
| JP | 2014-189198 A | 10/2014 |
| JP | 2015-205572 A | 11/2015 |
| JP | 2016-020876 A | 2/2016 |
| JP | 2016-107777 A | 6/2016 |
| JP | 2017-001501 A | 1/2017 |
| JP | 2017-007502 | 1/2017 |
| JP | 2017-049885 A | 3/2017 |
| JP | 2017-159699 A | 9/2017 |
| WO | 2016/024316 A1 | 2/2016 |
| WO | 2016/039288 A1 | 3/2016 |
| WO | 2016/163294 A1 | 10/2016 |

OTHER PUBLICATIONS

Japanese Decision to Grant a Patent, dated Oct. 2, 2018, with English Translation, issued in related Japanese Patent Application No. 2017-046045.

Japanese Office Action, dated Jul. 24, 2018, with English Translation, issued in related Japanese Patent Application No. 2017-046045.

Japanese Office Action, dated Jul. 24, 2018, with English Translation, issued in related Japanese Patent Application No. 2017-046047.

Japanese Office Action, dated Aug. 7, 2018, with English Translation, issued in related Japanese Patent Application No. 2017-046050.

Non-Final Office Action, dated Oct. 17, 2018, issued in related U.S. Appl. No. 15/877,859.

Non-Final Office Action, dated Jul. 11, 2018, issued in related U.S. Appl. No. 15/890,963.

Non-Final Office Action, dated Oct. 25, 2018, issued in related U.S. Appl. No. 15/888,791.

Non-Final Office Action, dated Jan. 2, 2019, issued in related U.S. Appl. No. 15/890,918.

Notice of Allowance issued in related U.S. Appl. No. 15/890,963, dated Dec. 19, 2018.

Notice of Allowance issued in related U.S. Appl. No. 15/888,858, dated Feb. 8, 2019.

Japanese Office Action issued in corresponding Japanese Patent Application No. 2017-046049, dated Aug. 7, 2018, with English Translation.

Japanese Office Action issue in corresponding Japanese Patent Application No. 2017-046452, dated Aug. 21, 2018, with English Translation.

Non-Final Office Action issued in related U.S. Appl. No. 15/888,858, dated Jul. 24, 2018.

(56) References Cited

OTHER PUBLICATIONS

Notice of Allowance issued in related U.S. Appl. No. 15/888,791, dated Mar. 15, 2019.

\* cited by examiner

| PRIORITY LEVEL | NOTIFICATION INFORMATION |
|---|---|
| | NOTIFICATION INFORMATION TO PEDESTRIAN |
| A | NO CROSSING |
| B | PERMISSION TO CROSS |
| | PROMPTING FOR CROSSING |
| C | GREETING |

FIG. 3

| PRIORITY LEVEL | NOTIFICATION INFORMATION |
|---|---|
| | NOTIFICATION INFORMATION TO VEHICLE |
| A | EMERGENCY STOP |
| B | WARNING: ACCIDENT |
| | WARNING: TRAFFIC JAM |
| C | GREETING |

FIG. 12

IMAGE DISPLAY DEVICE FOR DISPLAYING IMAGES ON A ROAD SURFACE

CROSS-REFERENCE TO RELATED APPLICATIONS

The present application claims priority from Japanese Patent Application No. 2017-046052 filed on Mar. 10, 2017, the entire contents of which are hereby incorporated by reference.

BACKGROUND

The technology relates to an image display device that displays an image on a road surface.

A device has been known that depicts figures or other geometrical shapes on a road surface, by a light-distribution control of headlights or other lights of a vehicle.

For example, Japanese Unexamined Patent Application Publication (JP-A) No. 2016-107777 describes an optical device that includes an illuminator and a controller. The illuminator is mounted on a vehicle and sends out light. The controller controls, in accordance with information on surroundings of the vehicle, the illuminator to intermittently illuminate a target of illumination with illumination or display, or both, based on the information on the surroundings of the vehicle.

SUMMARY

Regarding an image display device that displays an image on a road surface, there is a request for ability to appropriately notify information to a target of notification.

It is desirable to provide an image display device that makes it possible to appropriately notify information to a target of notification.

An aspect of the technology provides an image display device including an illuminator and a communicator. The illuminator is configured to send out light on a road surface around a first vehicle as an own vehicle, to display a first notification image on the road surface. The first notification image notifies information to surroundings of the first vehicle. The communicator is configured to perform inter-vehicle communication with a second vehicle other than the first vehicle. The illuminator is configured to display the first notification image on the basis of the inter-vehicle communication performed by the communicator.

An aspect of the technology provides an image display device including an illuminator, a communicator, and circuitry. The illuminator is configured to send out light on a road surface around a first vehicle as an own vehicle, to display a first notification image on the road surface. The first notification image notifies information to surroundings of the first vehicle. The communicator is configured to perform inter-vehicle communication with a second vehicle other than the first vehicle. The circuitry is configured to control the illuminator to display the first notification image on the basis of the inter-vehicle communication performed by the communicator.

BRIEF DESCRIPTION OF THE DRAWINGS

Some implementations of the technology are described below as mere examples with reference to the accompanying drawings.

FIG. 3 summarizes priority levels of notification information to be evaluated in the image display device according to the first implementation of the technology.

FIG. 12 summarizes priority levels of notification information to be evaluated in an image display device according to a fourth implementation of the technology.

DETAILED DESCRIPTION

Figure 1:
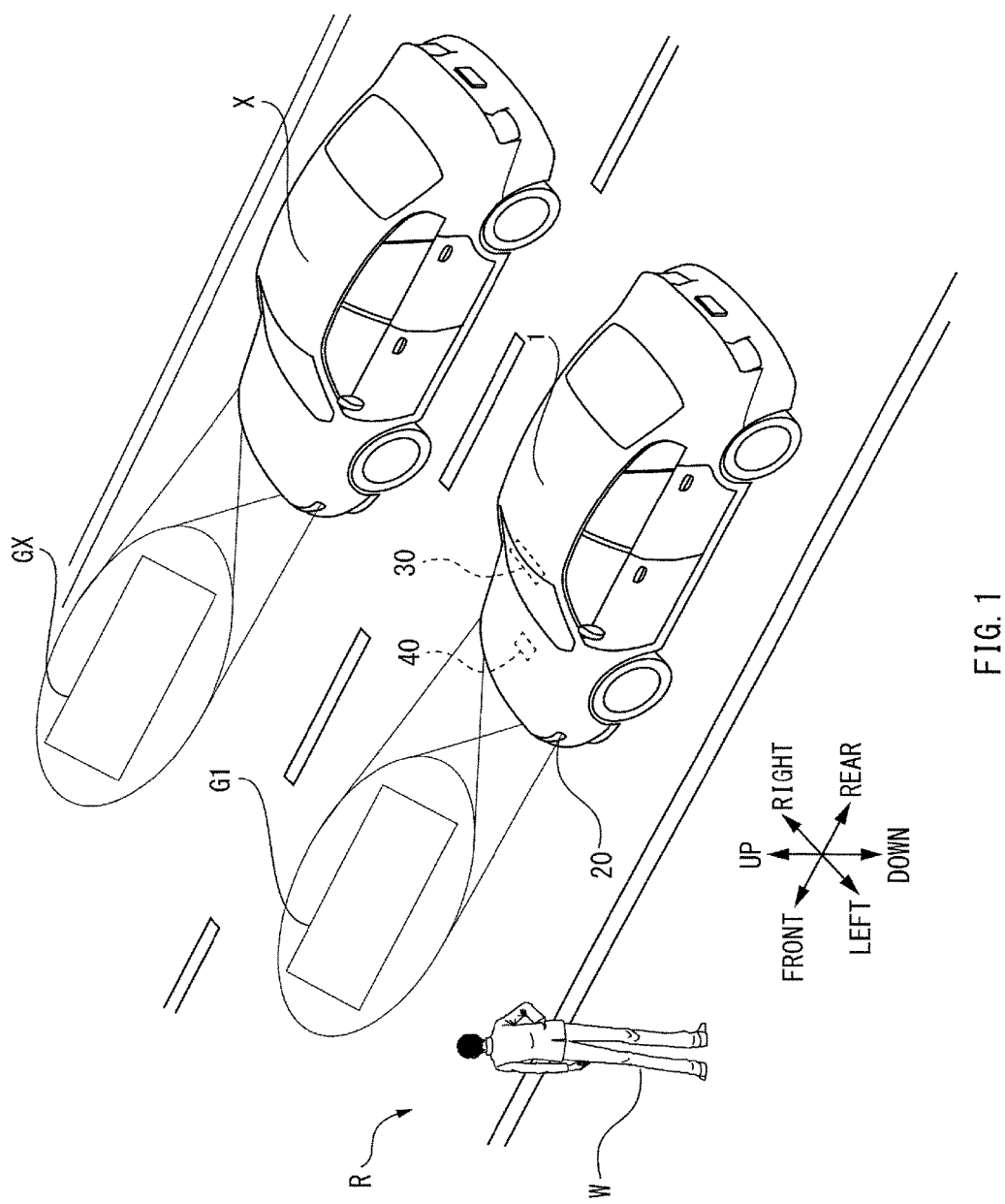
FIG. 1 illustrates an appearance and a configuration of an own vehicle including an image display device according to a first implementation of the technology.

In the following, some implementations of the technology are described in detail with reference to the drawings. The implementations described below each illustrate one example of the technology, and are not intended to limit the contents of the technology. All of the configurations and the operation described in each implementation are not necessarily essential for configurations and operation of the technology. It is to be noted that like constituent elements are denoted by the same reference characters, and description thereof is omitted to avoid redundancy.

[1. Configuration of Image Display Device]

Figure 2:
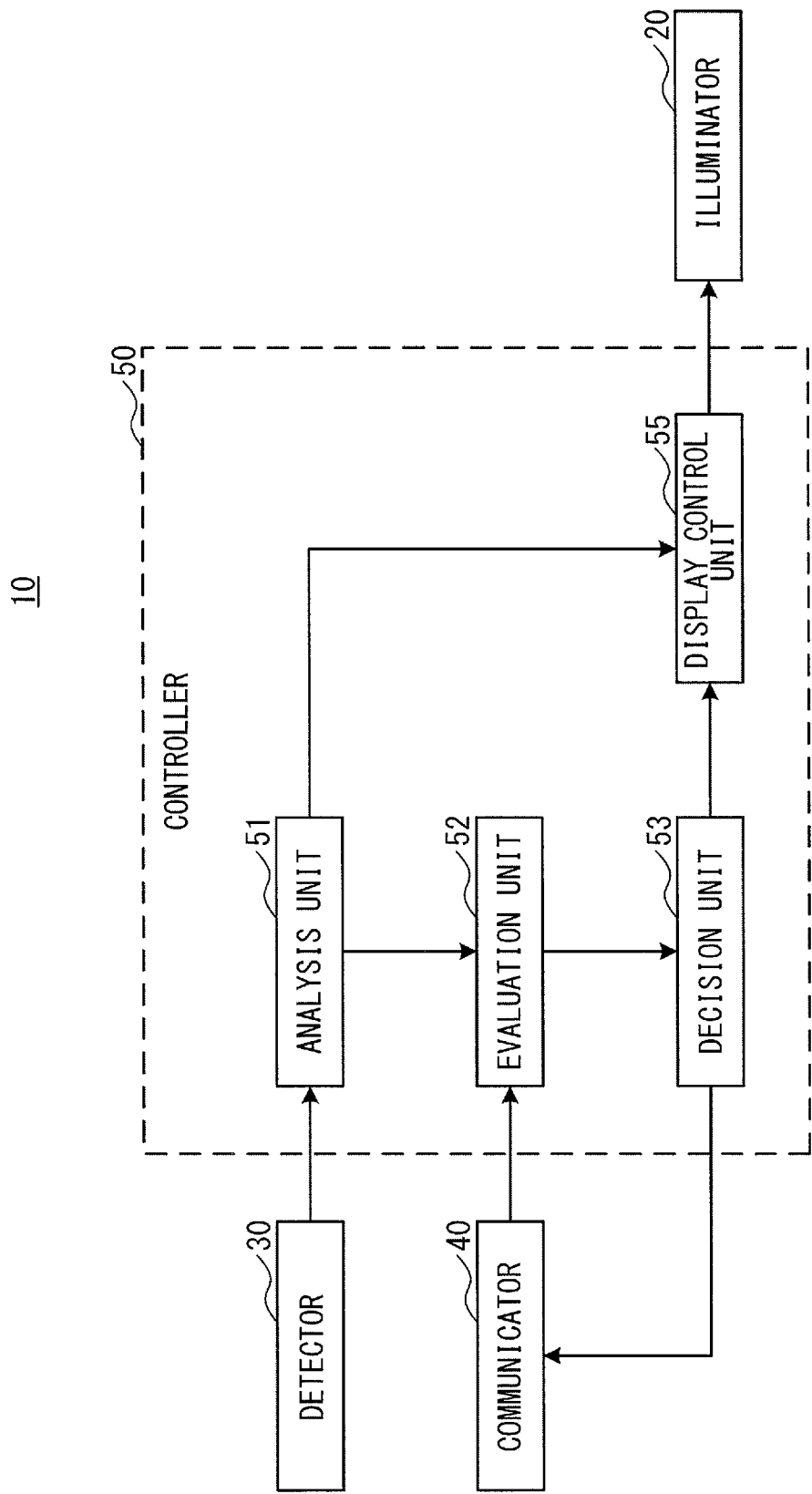
FIG. 2 is a block diagram of a functional configuration of the image display device according to the first implementation of the technology.

FIG. 1 illustrates an appearance and a configuration of an own vehicle 1 including an image display device 10 according to a first implementation of the technology. FIG. 2 is a block diagram of a functional configuration of the image display device 10 according to the first implementation of the technology. FIG. 3 is a table that summarizes priority levels of notification information to be evaluated in the image display device 10 according to the first implementation of the technology.

The image display device 10 may be a device that is mounted on the own vehicle 1, and displays an image on a road surface R around the own vehicle 1. The image display device 10 may be a device that displays the image on the road surface R, to notify information to a surrounding entity around the own vehicle 1. The term "surrounding entity" means a surrounding vehicle different from the own vehicle 1, and a pedestrian. The term "pedestrian" means a person who passes along a sidewalk, and a person who passes along or crosses a driveway, inclusive of a person who rides a bicycle.

The image to be displayed on the road surface R by the image display device 10 to notify the information to the surrounding entity around the own vehicle 1 is also called an "own-vehicle notification image". The information to be notified by the own-vehicle notification image to the surrounding entity around the own vehicle 1 is also called "own-vehicle notification information". An image to be displayed on the road surface R by an image display device of a surrounding vehicle X to notify information to a surrounding entity around the surrounding vehicle X is also called a "surrounding-vehicle notification image". The information to be notified by the surrounding-vehicle notification image to the surrounding entity around the surrounding vehicle X is also called "surrounding-vehicle notification information". The own-vehicle notification image and the surrounding-vehicle notification image are also generically called "notification images". The own-vehicle notification information and the surrounding-vehicle notification information are also generically called "notification information". Moreover, processing to be performed by the image display device 10 to display the own-vehicle notification image G1 on the road surface R is also called "image display processing".

As illustrated in FIGS. 1 and 2, the image display device 10 may be a device that displays the own-vehicle notification image G1 on the road surface R frontward of the own vehicle 1, to notify the information to a pedestrian W frontward of the own vehicle 1. The notification images G including the own-vehicle notification image G1 and the surrounding-vehicle notification image GX may each be a still image, a moving image, or a combination thereof. The notification images G may each be a three-dimensional image such as hologram. It is to be noted that the term "frontward of the vehicle 1" means a direction of an advance of the own vehicle 1, as illustrated in FIG. 1.

The image display device 10 may include an illuminator 20, a detector 30, a communicator 40, and a controller 50.

The illuminator 20 may be a device that sends out light on the road surface R frontward of the own vehicle 1. The image to be displayed on the road surface R by the image display device 10 may be depicted by the light sent out by the illuminator 20. In other words, the illuminator 20 may be able to send out the light on the road surface R frontward of the own vehicle 1, to display the image on the road surface R. The illuminator 20 may include various light sources such as a lamp, a light emitting diode (LED), a digital micro mirror device, and a projector. The illuminator 20 may include headlights of the own vehicle 1. In one preferred but non-limiting example, the illuminator 20 may include light-distribution-variable headlights such as adaptive driving beam (ADB).

The detector 30 may be a sensor that detects surroundings of the own vehicle 1. The detector 30 may include one or more cameras. The detector 30 may include a combination of a camera and, for example, radar. The term "surroundings of the own vehicle 1" means road environment of a road on which the own vehicle 1 is located. Non-limiting examples of the road environment to be detected by the detector 30 may include roads, pedestrians, vehicles, road markings, road signs, traffic lights, intersections, railway crossings, footbridges, street lamps, buildings, and equipment.

In particular, the detector 30 may be able to detect the pedestrian W frontward of the own vehicle 1. In one specific but non-limiting example, the detector 30 may detect, in real time, a pedestrian position and a pedestrian direction. The pedestrian position may indicate a position of the pedestrian W frontward of the own vehicle 1. The pedestrian direction may indicate a direction of the pedestrian W. The detector 30 may supply the controller 50 with information regarding the pedestrian position detected, and with information regarding the pedestrian direction detected. It is to be noted that the pedestrian direction means a direction of movement of the pedestrian W in a case where the pedestrian W is moving. In a case where the pedestrian W is standing still, the pedestrian direction means a direction to which the face of the pedestrian W is turned.

The communicator 40 may be a communication module that performs inter-vehicle communication with the surrounding vehicle X. The inter-vehicle communication may be performed by wireless communication. In a case with presence of the surrounding vehicle X around the own vehicle 1, with the surrounding vehicle X including an image display device similar to the image display device 10, it is plausible that the surrounding vehicle X displays the surrounding-vehicle notification image GX to the pedestrian W on the road surface R, to notify the surrounding-vehicle notification information to the pedestrian W. Moreover, it is also plausible that the surrounding-vehicle notification information is the notification information in accordance with a state of the pedestrian W, as with the own-vehicle notification information. The own vehicle 1 may be able to request, through the communicator 40, the surrounding vehicle X to transmit the surrounding-vehicle notification information. The communicator 40 may receive the surrounding-vehicle notification information transmitted by the surrounding vehicle X. Upon the receipt of the surrounding-vehicle notification information, the communicator 40 may supply the surrounding-vehicle notification information received, to the controller 50.

The controller 50 may be a control unit that controls image display on the road surface R by the image display device 10. The controller 50 may be a control unit that controls the illuminator 20 on the basis of the information supplied from the detector 30 and the communicator 40. The controller 50 may include an electronic control unit (ECU) that synthetically controls constituent elements included in the image display device 10.

The controller 50 may include an analysis unit 51, an evaluation unit 52, a decision unit 53, and a display control unit 55.

The analysis unit 51 may have a function of analyzing the state of the pedestrian W detected by the detector 30, and identifying the own-vehicle notification information. The state of the pedestrian W to be analyzed by the analysis unit 51 may include the pedestrian position and the pedestrian direction of the pedestrian W, and behavior and safety of the pedestrian W to be predicted from road environment regarding the pedestrian W. Non-limiting examples of the road environment regarding the pedestrian W may include a road width of the road, the number of lanes of the road, the road markings and the road signs, the own vehicle 1 and the surrounding vehicle X around the pedestrian W, and the traffic lights.

The analysis unit 51 may analyze the state of the pedestrian W on the basis of these pieces of information, and identify, in accordance with the state of the pedestrian W, the own-vehicle notification information to be notified to the pedestrian W. For example, let us assume that the analysis unit 51 analyzes the state of the pedestrian W as follows. The pedestrian position is located close to the driveway, and far away from the own vehicle 1. The pedestrian direction is an approaching direction with respect to the driveway. The road includes one lane on each side, and the road width is small. There is no surrounding vehicle X. There are no road markings, no road signs, nor traffic lights. In this case, the analysis unit 51 may make a prediction that the pedestrian W will cross the driveway, and make a prediction that the safety of the pedestrian W will be protected even if the pedestrian W crosses. The analysis unit 51 may identify the own-vehicle notification information in accordance with, for example, the predicted behavior of the pedestrian W. For example, as illustrated in FIG. 3, the analysis unit 51 may identify, as the own-vehicle notification information to the pedestrian W, information indicating "prompting for crossing". The information indicating "prompting for crossing" prompts the pedestrian W to cross the driveway. The analysis unit 51 may supply the evaluation unit 52 with the own-vehicle notification information identified.

The evaluation unit 52 may have a function of evaluating the priority level of the notification information. The priority level may be an index that indicates whether to give priority to notifying the own-vehicle notification information to a target of notification or whether to give priority to notifying the surrounding-vehicle notification information to the target of notification. The priority level may be relative merits of the notification information evaluated with reference to whether the safety of the pedestrian W is protected more easily by the own-vehicle notification information or whether the safety of the pedestrian W is protected more easily by the surrounding-vehicle notification information. In other words, the evaluation unit 52 may evaluate the priority level with reference to the safety of the pedestrian W detected by the detector 30. The evaluation unit 52 may evaluate the priority level of the own-vehicle notification information identified by the analysis unit 51 and the priority level of the surrounding-vehicle notification information received by the communicator 40. The evaluation unit 52 may supply an evaluation result to the decision unit 53.

For example, as summarized in FIG. 3, the evaluation unit 52 may evaluate information indicating "no crossing" as a priority level A of the highest priority level. The information indicating "no crossing" notifies the pedestrian W of prohibition of crossing the driveway. The evaluation unit 52 may evaluate information indicating "permission to cross" as a priority level B of a lower priority level than "no crossing". The information indicating "permission to cross" notifies the pedestrian W of permission to cross the driveway. The evaluation unit 52 may evaluate the information indicating "prompting for crossing" as the priority level B of the lower priority level than "no crossing". The information indicating "prompting for crossing" prompts the pedestrian W to cross the driveway. The evaluation unit 52 may evaluate information indicating "greeting" as a priority level C of the lowest priority level. The information indicating "greeting" notifies a greeting to the pedestrian W.

The decision unit 53 may have a function of deciding a display mode of the own-vehicle notification image G1. The display mode of the own-vehicle notification image G1 may include at least a display form and a display region of the own-vehicle notification image G1, in addition to an image itself of the own-vehicle notification image G1. The display form of the own-vehicle notification image G1 may be, for example, a size, luminance, and a color of the own-vehicle notification image G1, and indicate whether or not to cause the own-vehicle notification image G1 to be on more highlighted display than normal. The display region of the own-vehicle notification image G1 may be a predetermined region of the road surface R where the own-vehicle notification image G1 is to be displayed. Moreover, the display mode of the own-vehicle notification image G1 may include display timing, i.e., timing at which the own-vehicle notification image G1 is to be displayed in the display region.

The decision unit 53 may decide the display mode of the own-vehicle notification image G1, on the basis of the inter-vehicle communication with the surrounding vehicle X performed by the communicator 40. At this occasion, the decision unit 53 may decide the display mode of the own-vehicle notification image G1, to keep the own-vehicle notification image G1 from interfering with the surrounding-vehicle notification image GX. The interference of the own-vehicle notification image G1 with the surrounding-vehicle notification image GX means that the notification information indicated by one of the images impairs the notification information indicated by the other of the images, because of, for example, overlap or superposition of the display region of the own-vehicle notification image G1 on a display region of the surrounding-vehicle notification image GX, and coincidence of the display timing of the own-vehicle notification image G1 with display timing of the surrounding-vehicle notification image GX. However, even in the case with the overlap or the superposition of the display region of the own-vehicle notification image G1 on the display region of the surrounding-vehicle notification image GX, and the coincidence of the display timing of the own-vehicle notification image G1 with the display timing of the surrounding-vehicle notification image GX, there occurs no interference of the own-vehicle notification image G1 with the surrounding-vehicle notification image GX, when the display regions of the own-vehicle notification image G1 and the surrounding-vehicle notification image GX are substantially superposed, and the own-vehicle notification image G1 and the surrounding-vehicle notification image GX are displayed as a substantially identical image and in a substantially identical display form. The interference of the own-vehicle notification image G1 with the surrounding-vehicle notification image GX may cause possibility that the target of notification, e.g., the pedestrian W, becomes less likely to appropriately recognize the notification information important for the target of notification. Therefore, the decision unit 53 may decide the display mode of the own-vehicle notification image G1, to keep the own-vehicle notification image G1 from interfering with the surrounding-vehicle notification image GX.

In one specific but non-limiting example, the decision unit 53 may decide the display mode of the own-vehicle notification image G1 on the basis of the evaluation result of the evaluation unit 52. For example, in a case where the priority level of the own-vehicle notification information is higher than the priority level of the surrounding-vehicle notification information, the decision unit 53 may decide the display mode of the own-vehicle notification image G1, to cause the own-vehicle notification image G1 to be displayed in the predetermined region of the road surface R. Moreover, in a case where the priority level of the own-vehicle notification information is lower than the priority level of the surrounding-vehicle notification information, the decision unit 53 may allow the communicator 40 to transmit, to the surrounding vehicle X, a notification that the surrounding vehicle X should display the surrounding-vehicle notification image GX. In addition, in this case, the decision unit 53 may decide the display mode of the own-vehicle notification image G1, to defer displaying the own-vehicle notification image G1, at least while the surrounding-vehicle notification image GX is being displayed. It is to be noted that details of the display mode of the own-vehicle notification image G1 to be decided on the basis of the evaluation result of the evaluation unit 52 are described later with reference to FIGS. 4 and 5.

The display control unit 55 may have a function of performing a display control of the own-vehicle notification image G1 on the road surface R. The display control unit 55 may control the illuminator 20 to cause the own-vehicle notification image G1 to be displayed on the road surface R in accordance with the display mode decided by the decision unit 53.

[2. Detailed Flow of Image Display Processing]

Figure 4:
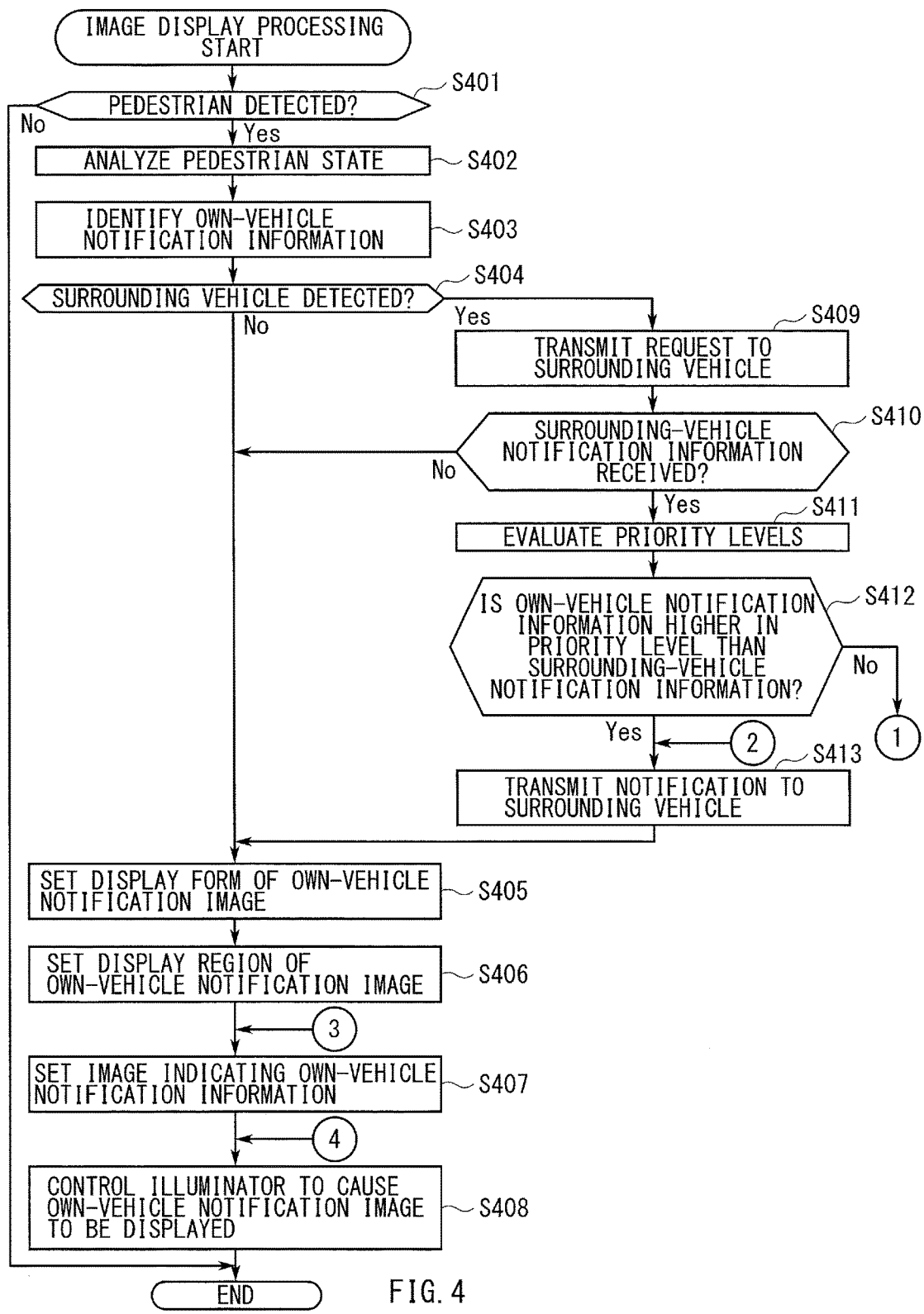
FIG. 4 is a flowchart of a detailed flow of image display processing to be performed in the image display device according to the first implementation of the technology.
Figure 5:
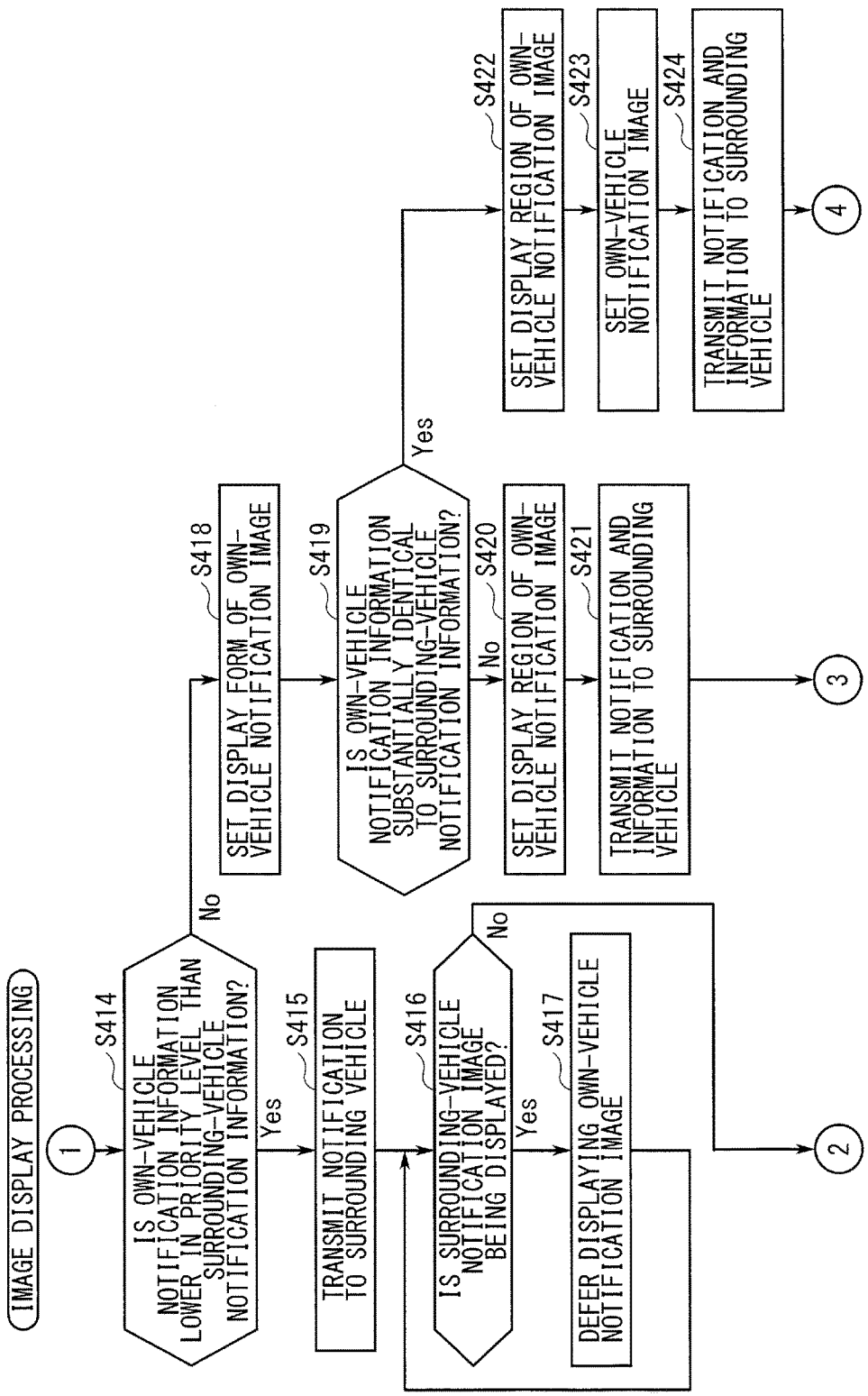
FIG. 5 is a flowchart of the detailed flow of the image display processing to be executed subsequent to the processing illustrated in FIG. 4.

FIG. 4 is a flowchart of a detailed flow of the image display processing to be performed in the image display device 10 according to the first implementation of the technology. FIG. 5 is a flowchart of the detailed flow of the image display processing to be executed subsequent to the processing illustrated in FIG. 4.

The image display processing illustrated in FIGS. 4 and 5 may be executed as timer interruption processing performed at predetermined cycles.

In step S401, the controller 50 may determine whether or not the pedestrian W has been detected by the detector 30. In one specific but non-limiting example, the controller 50 may determine whether or not an image of the pedestrian W is included in images acquired by the detector 30, to determine whether or not the pedestrian W has been detected by the detector 30. In a case where the pedestrian W has not been detected by the detector 30, the controller 50 may end the processing. In a case where the pedestrian W has been detected by the detector 30, the controller 50 may proceed to step S402.

In step S402, the controller 50 may analyze the state of the pedestrian W detected by the detector 30.

In step S403, the controller 50 may identify the own-vehicle notification information to the pedestrian W, in accordance with the analyzed state of the pedestrian W.

In step S404, the controller 50 may determine whether or not the surrounding vehicle X has been detected. In one specific but non-limiting example, the controller 50 may determine whether or not the surrounding vehicle X is included in the images acquired by the detector 30, to determine whether or not the surrounding vehicle X has been detected. Alternatively, the controller 50 may determine whether or not a response from the surrounding vehicle X has been received by the inter-vehicle communication performed by the communicator 40, to determine whether or not the surrounding vehicle X has been detected. In a case where the surrounding vehicle X has been detected, the controller 50 may proceed to step S409. In a case where the surrounding vehicle X has not been detected, the controller 50 may proceed to step S405.

In step S405, the controller 50 may set the display form of the own-vehicle notification image G1. In one specific but non-limiting example, the controller 50 may set the display form of the own-vehicle notification image G1, to cause the own-vehicle notification image G1 to be displayed in a normal display form.

In step S406, the controller 50 may set the predetermined region of the road surface R located frontward of the own vehicle 1, as the display region where the own-vehicle notification image G1 is to be displayed.

In step S407, the controller 50 may set an image indicating the identified own-vehicle notification information, as the own-vehicle notification image G1.

In step S408, the controller 50 may control the illuminator 20 to cause the own-vehicle notification image G1 to be displayed on the road surface R, as the set image, in the set display form, and in the set display region. Thereafter, the controller 50 may end the processing.

In step S409, the controller 50 may allow the communicator 40 to transmit a transmission request to the surrounding vehicle X. The transmission request may be a request that the surrounding vehicle X should transmit the surrounding-vehicle notification information to the own vehicle 1.

In step S410, the controller 50 may determine whether or not the communicator 40 has received the surrounding-vehicle notification information transmitted from the surrounding vehicle X. In a case where the communicator 40 has received the surrounding-vehicle notification information transmitted from the surrounding vehicle X, the controller 50 may proceed to step S411. In a case where the communicator 40 has not received the surrounding-vehicle notification information transmitted from the surrounding vehicle X, the controller 50 may proceed to step S405.

In step S411, the controller 50 may evaluate the priority level of the own-vehicle notification information identified, and the priority level of the surrounding-vehicle notification information received by the communicator 40. On the basis of the evaluation result, the controller 50 may decide the display mode of the own-vehicle notification image G1, as described in the following steps.

In step S412, the controller 50 may determine whether or not the priority level of the own-vehicle notification information is higher than the priority level of the surrounding-vehicle notification information. In a case where the priority level of the own-vehicle notification information is not higher than the priority level of the surrounding-vehicle notification information, the controller 50 may proceed to step S414. In a case where the priority level of the own-vehicle notification information is higher than the priority level of the surrounding-vehicle notification information, the controller 50 may proceed to step S413.

In step S413, the controller 50 may allow the communicator 40 to transmit, to the surrounding vehicle X, a notification that the own vehicle 1 is going to display the own-vehicle notification image G1. Thereafter, the controller 50 may proceed to step S405. After the controller 50 proceeding to step S405, on the road surface R, display of the own-vehicle notification image G1 may be started. As a result, solely the own-vehicle notification image G1 may be displayed on the road surface R. Thus, the own-vehicle notification image G1 may be displayed without interfering with the surrounding-vehicle notification image GX.

In step S414, the controller 50 may determine whether or not the priority level of the own-vehicle notification information is lower than the priority level of the surrounding-vehicle notification information. In a case where the priority level of the own-vehicle notification information is not lower than the priority level of the surrounding-vehicle notification information, the controller 50 may proceed to step S418. In a case where the priority level of the own-vehicle notification information is lower than the priority level of the surrounding-vehicle notification information, the controller 50 may proceed to step S415.

In step S415, the controller 50 may allow the communicator 40 to transmit, to the surrounding vehicle X, a notification that the surrounding vehicle X should display the surrounding-vehicle notification image GX. On the road surface R, display of the surrounding-vehicle notification image GX may be started. As a result, solely the surrounding-vehicle notification image GX may be displayed on the road surface R.

In step S416, the controller 50 may determine whether or not the surrounding-vehicle notification image GX is being displayed on the road surface R. In a case where the surrounding-vehicle notification image GX is being displayed on the road surface R, the controller 50 may proceed to step S417. In a case where the surrounding-vehicle notification image GX is not being displayed on the road surface R, the controller 50 may proceed to step S413.

In step S417, the controller 50 may defer displaying the own-vehicle notification image G1 on the road surface R, and proceed to step S416. In other words, the controller 50 may defer displaying the own-vehicle notification image G1, at least while the surrounding-vehicle notification image GX is being displayed. Upon an end of the display of the surrounding-vehicle notification image GX, the controller 50 may proceed to step S413 from step S416. After the controller 50 proceeding to step S413, on the road surface R, display of the own-vehicle notification image G1 may be started. As a result, solely the own-vehicle notification image G1 may be displayed on the road surface R. Thus, the own-vehicle notification image G1 may be displayed without interfering with the surrounding-vehicle notification image GX.

It is to be noted that in the case where the priority level of the own-vehicle notification information is lower than the priority level of the surrounding-vehicle notification information, the controller 50 may cause the own-vehicle notification image G1 to be non-displayed, instead of deferring displaying the own-vehicle notification image G1 until the end of the display of the surrounding-vehicle notification image GX.

In step S418, the controller 50 may set the display form of the own-vehicle notification image G1, to cause the own-vehicle notification image G1 and the surrounding-vehicle notification image GX to be displayed in the substantially identical display form to each other. In one specific but non-limiting example, the controller 50 may identify values of the size, the luminance, and the color of the notification image G. The values are able to be commonalized or standardized as the display form of the own-vehicle notification image G1 and the surrounding-vehicle notification image GX. The controller 50 may set the display form of the own-vehicle notification image G1, with the identified values.

In step S419, the controller 50 may determine whether or not the own-vehicle notification information is substantially identical to the surrounding-vehicle notification information. If a determination of "NO" is made in step S414, the priority level of the own-vehicle notification information is equivalent to the priority level of the surrounding-vehicle notification information. In this case, the controller 50 may determine whether or not the own-vehicle notification information is substantially identical to the surrounding-vehicle notification information. On the basis of a determination result, the controller 50 may decide the display mode of the own-vehicle notification image G1. In a case where the own-vehicle notification information is substantially identical to the surrounding-vehicle notification information, the controller 50 may proceed to step S422. In a case where the own-vehicle notification information is substantially non-identical to the surrounding-vehicle notification information, the controller 50 may proceed to step S420.

In step S420, the controller 50 may set, as the display region of the own-vehicle notification image G1, the predetermined region of the road surface R that makes it possible to display the own-vehicle notification image G1 and the surrounding-vehicle notification image GX in spaced relation to each other by a predetermined distance.

In step S421, the controller 50 may allow the communicator 40 to transmit, to the surrounding vehicle X, a notification that indicates the display mode of the surrounding-vehicle notification image GX. In one specific but non-limiting example, the controller 50 may allow the communicator 40 to transmit, to the surrounding vehicle X, a notification that the own-vehicle notification image G1 and the surrounding-vehicle notification image GX should be displayed in the substantially identical display form to each other and in the spaced relation to each other by the predetermined distance. Simultaneously, the controller 50 may allow the communicator 40 to transmit, to the surrounding vehicle X, information regarding the display form and the display region of the own-vehicle notification image G1. Thereafter, the controller 50 may proceed to step S407. After the controller 50 proceeding to step S407, on the road surface R, the own-vehicle notification image G1 and the surrounding-vehicle notification image GX may be displayed in the display regions spaced away from each other by the predetermined distance. The own-vehicle notification image G1 and the surrounding-vehicle notification image GX may have the substantially identical display form to each other. Thus, the own-vehicle notification image G1 may be displayed without interfering with the surrounding-vehicle notification image GX.

In step S422, the controller 50 may set the display region of the own-vehicle notification image G1, to cause the own-vehicle notification image G1 and the surrounding-vehicle notification image GX to be displayed in a substantially identical display region to each other. In one specific but non-limiting example, the controller 50 may identify a predetermined region of the road surface R that is able to be commonalized or standardized as the display region of the own-vehicle notification image G1 and the surrounding-vehicle notification image GX. The controller 50 may set the predetermined region thus identified, as the display region of the own-vehicle notification image G1.

In step S423, the controller 50 may set the own-vehicle notification image G1, to cause the own-vehicle notification image G1 and the surrounding-vehicle notification image GX to be displayed as a substantially identical image to each other. In one specific but non-limiting example, the controller 50 may identify an image that is able to be commonalized or standardized as the own-vehicle notification image G1 and the surrounding-vehicle notification image GX. Thereafter, the controller 50 may set the identified image, as the own-vehicle notification image G1.

In step S424, the controller 50 may allow the communicator 40 to transmit, to the surrounding vehicle X, a notification that indicates the display mode of the surrounding-vehicle notification image GX. In one specific but non-limiting example, the controller 50 may allow the communicator 40 to transmit, to the surrounding vehicle X, a notification that the own-vehicle notification image G1 and the surrounding-vehicle notification image GX should be displayed as the substantially identical image to each other, in the substantially identical display form to each other, and in the substantially identical display region to each other in superimposed relation. Simultaneously, the controller 50 may allow the communicator 40 to transmit, to the surrounding vehicle X, information regarding the own-vehicle notification image G1, the display form of the own-vehicle notification image G1, and the display region of the own-vehicle notification image G1. Thereafter, the controller 50 may proceed to step S408. After the controller 50 proceeding to step S408, on the road surface R, the own-vehicle notification image G1 and the surrounding-vehicle notification image GX may be displayed in the substantially identical display region in the superimposed relation. The own-vehicle notification image G1 and the surrounding-vehicle notification image GX may be the substantially identical image to each other, and have the substantially identical display form to each other. In other words, on the road surface R, the own-vehicle notification image G1 and the surrounding-vehicle notification image GX may be on unitized display. Thus, the own-vehicle notification information may be kept from interfering with notification of the surrounding-vehicle notification information. Accordingly, the own-vehicle notification image G1 may be displayed without interfering with the surrounding-vehicle notification image GX.

[3. Notification Image to be Displayed by Image Display Processing]

Figure 6A:
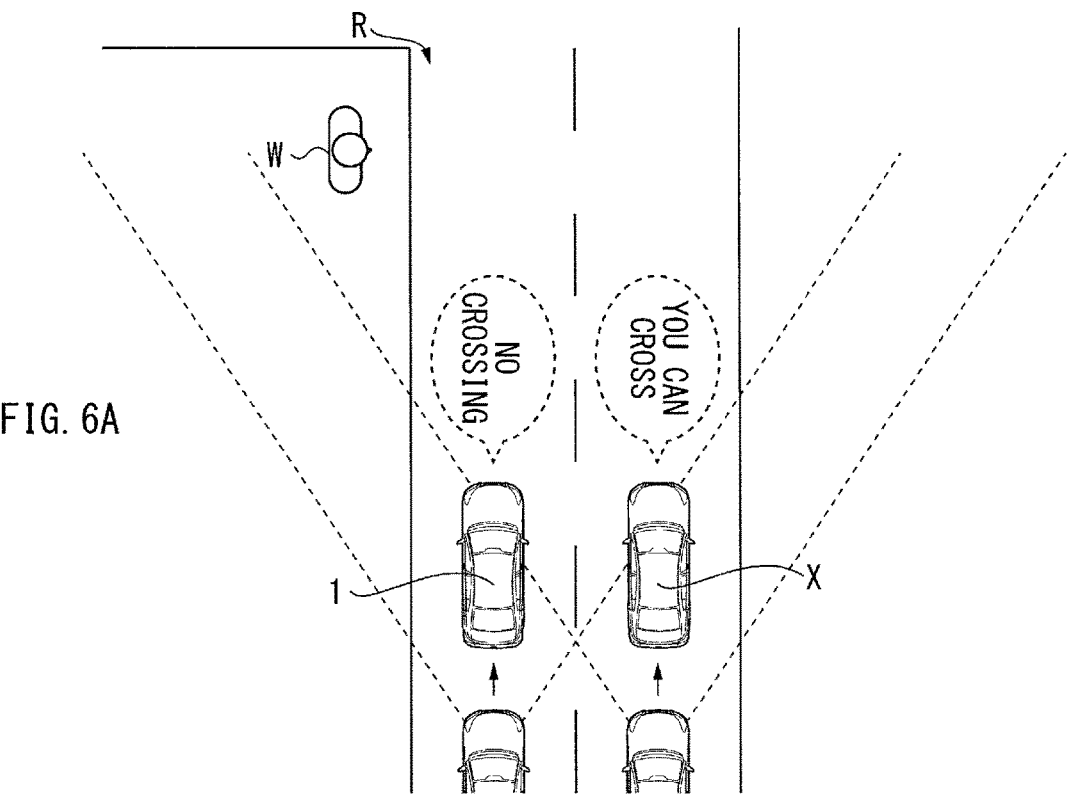
FIG. 6A illustrates a notification image to be displayed by the image display device according to the first implementation of the technology, in a case where a priority level of own-vehicle notification information is higher than a priority level of surrounding-vehicle notification information.
Figure 6B:
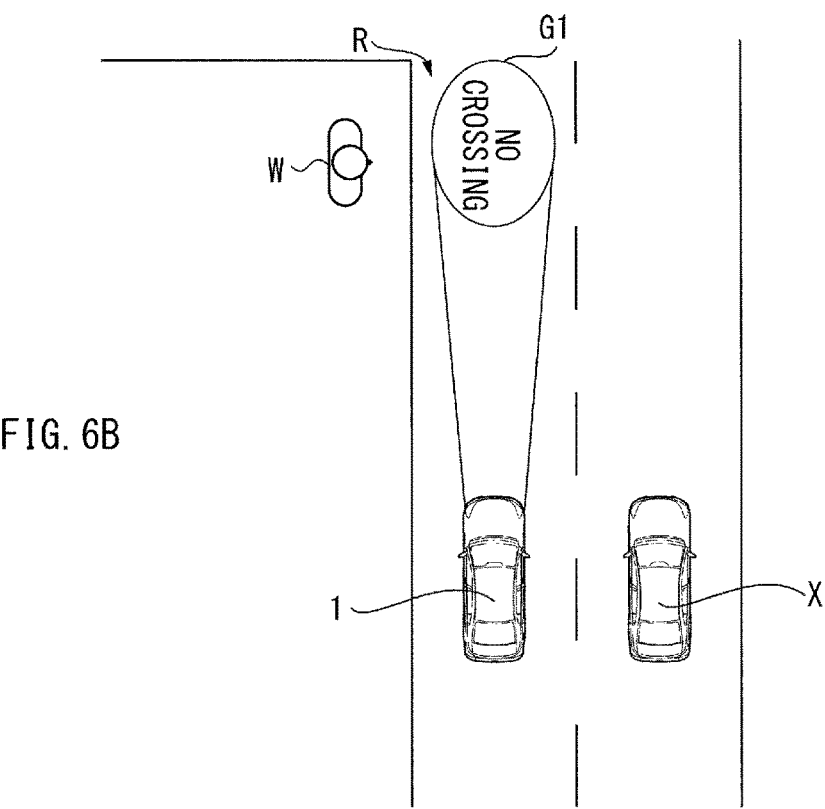
FIG. 6B illustrates the notification image to be displayed by the image display device according to the first implementation of the technology, in the case where the priority level of the own-vehicle notification information is higher than the priority level of the surrounding-vehicle notification information.

FIGS. 6A and 6B illustrate the notification image G to be displayed by the image display device 10 according to the first implementation of the technology, in the case where the priority level of the own-vehicle notification information is higher than the priority level of the surrounding-vehicle notification information. FIG. 6A illustrates a state in which the own-vehicle notification information and the surrounding-vehicle notification information have been identified. FIG. 6B illustrates a state in which the own-vehicle notification image G1 has been displayed.

Let us assume that as illustrated in FIG. 6A, the image display device 10 has identified the information indicating "no crossing" of the priority level A, as the own-vehicle notification information to the pedestrian W. Moreover, let us assume that the surrounding vehicle X has identified the information indicating "permission to cross" of the priority level B, as the surrounding-vehicle notification information to the pedestrian W. The priority level of the own-vehicle notification information is higher than the priority level of the surrounding-vehicle notification information.

In this case, the image display device 10 may transmit, to the surrounding vehicle X, the notification that the own vehicle 1 is going to display the own-vehicle notification image G1. As illustrated in FIG. 6B, the image display device 10 may display the own-vehicle notification image G1 indicating "no crossing" identified as the own-vehicle notification information. The surrounding vehicle X may defer displaying the surrounding-vehicle notification image GX, at least while the own-vehicle notification image G1 is being displayed. It is to be noted that the surrounding vehicle X may cause the surrounding-vehicle notification image GX to be non-displayed even after an end of the display of the own-vehicle notification image G1.

Figure 7A:
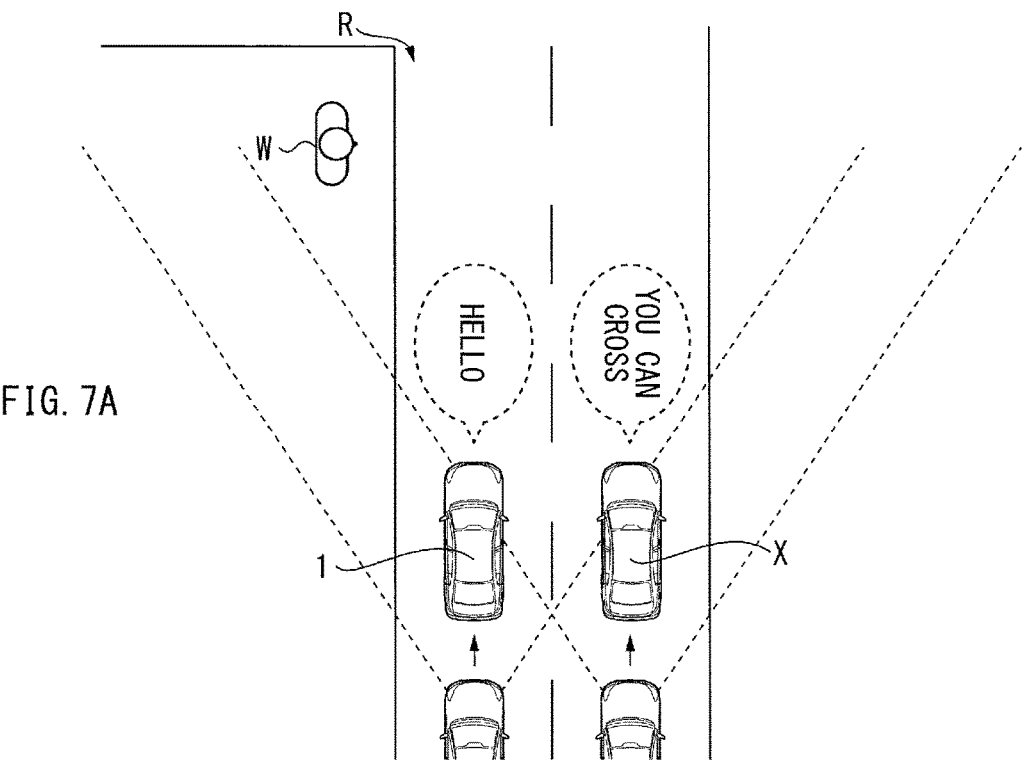
FIG. 7A illustrates the notification image to be displayed by the image display device according to the first implementation of the technology, in a case where the priority level of the own-vehicle notification information is lower than the priority level of the surrounding-vehicle notification information.
Figure 7B:
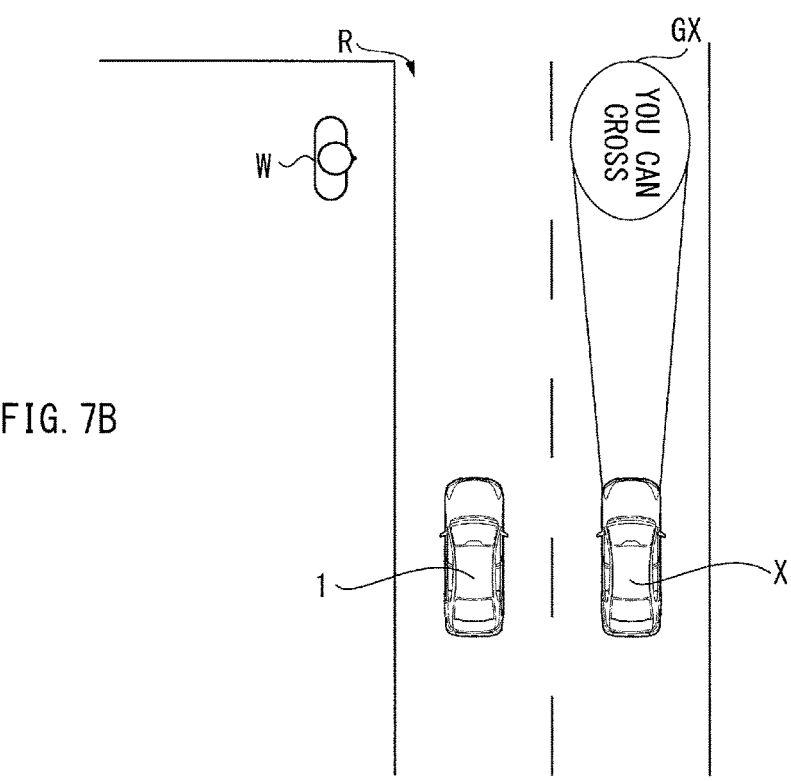
FIG. 7B illustrates the notification image to be displayed by the image display device according to the first implementation of the technology, in the case where the priority level of the own-vehicle notification information is lower than the priority level of the surrounding-vehicle notification information.

FIGS. 7A and 7B illustrate the notification image G to be displayed by the image display device 10 according to the first implementation of the technology, in the case where the priority level of the own-vehicle notification information is lower than the priority level of the surrounding-vehicle notification information. FIG. 7A illustrates a state in which the own-vehicle notification information and the surrounding-vehicle notification information have been identified. FIG. 7B illustrates a state in which the surrounding-vehicle notification image GX has been displayed.

Let us assume that as illustrated in FIG. 7A, the image display device 10 has identified the information indicating "greeting" of the priority level C, as the own-vehicle notification information to the pedestrian W. Moreover, let us assume that the surrounding vehicle X has identified the information indicating "permission to cross" of the priority level B, as the surrounding-vehicle notification information to the pedestrian W. The priority level of the own-vehicle notification information is lower than the surrounding-vehicle notification information.

In this case, the image display device 10 may transmit, to the surrounding vehicle X, the notification that the surrounding vehicle X should display the surrounding-vehicle notification image GX. Thus, the image display device 10 may allow the surrounding vehicle X to display the surrounding-vehicle notification image GX indicating "permission to cross" identified as the surrounding-vehicle notification information. As illustrated in FIG. 7B, the image display device 10 may defer displaying the own-vehicle notification image G1, at least while the surrounding-vehicle notification image GX is being displayed. It is to be noted that the image display device 10 may cause the own-vehicle notification image G1 to be non-displayed even after the end of the display of the surrounding-vehicle notification image GX.

Figure 8A:
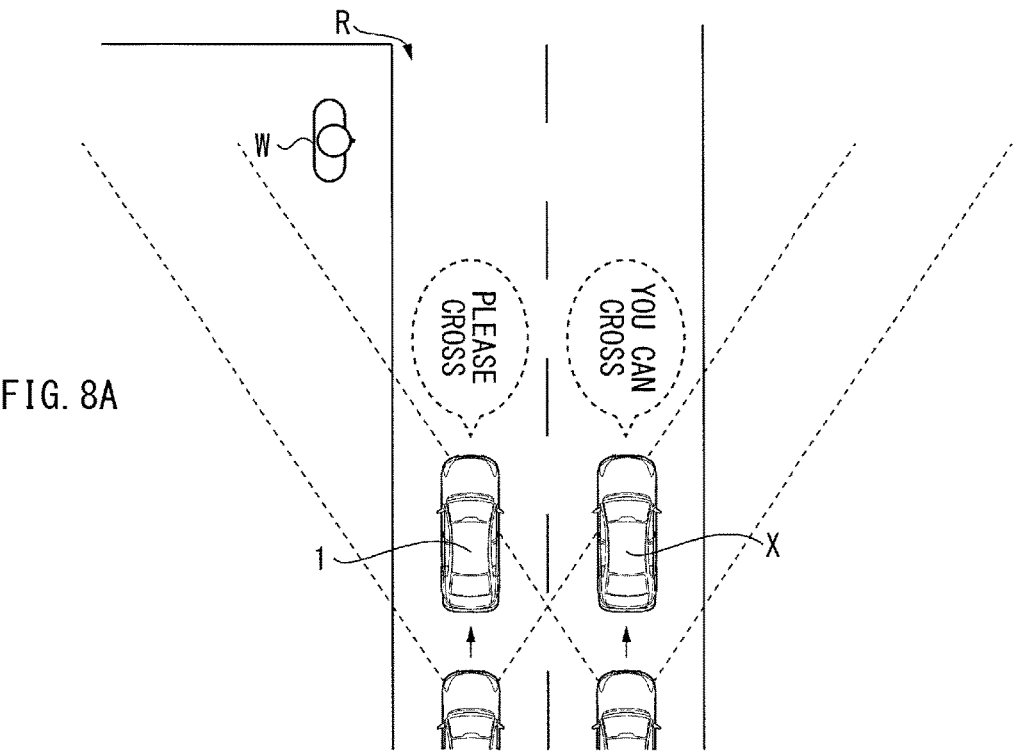
FIG. 8A illustrates the notification image to be displayed by the image display device according to the first implementation of the technology, in a case where the priority level of the own-vehicle notification information is equivalent to the priority level of the surrounding-vehicle notification information, and the own-vehicle notification information and the surrounding-vehicle notification information are substantially non-identical.
Figure 8B:
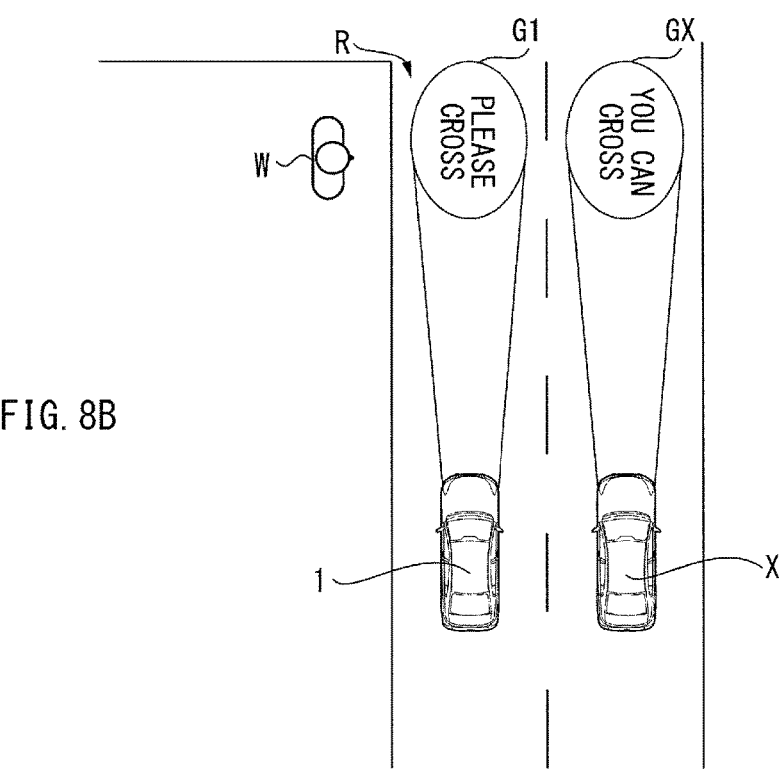
FIG. 8B illustrates the notification image to be displayed by the image display device according to the first implementation of the technology, in the case where the priority level of the own-vehicle notification information is equivalent to the priority level of the surrounding-vehicle notification information, and the own-vehicle notification information and the surrounding-vehicle notification information are substantially non-identical.

FIGS. 8A and 8B illustrate the notification image G to be displayed by the image display device 10 according to the first implementation of the technology, in the case where the priority level of the own-vehicle notification information is equivalent to the priority level of the surrounding-vehicle notification information, and the own-vehicle notification information and the surrounding-vehicle notification information are substantially non-identical. FIG. 8A illustrates a state in which the own-vehicle notification information and the surrounding-vehicle notification information have been identified. FIG. 8B illustrates a state in which the own-vehicle notification image G1 and the surrounding-vehicle notification image GX have been displayed.

Let us assume that as illustrated in FIG. 8A, the image display device 10 has identified the information indicating "prompting for crossing" of the priority level B, as the own-vehicle notification information to the pedestrian W. Moreover, let us assume that the surrounding vehicle X has identified the information indicating "permission to cross" of the priority level B, as the surrounding-vehicle notification information to the pedestrian W. The priority level of the own-vehicle notification information is equivalent to the priority level of the surrounding-vehicle notification information. The own-vehicle notification information is substantially non-identical to the surrounding-vehicle notification information.

In this case, the image display device 10 may transmit, to the surrounding vehicle X, the notification that the own-vehicle notification image G1 and the surrounding-vehicle notification image GX should be displayed in the substantially identical display form and in the spaced relation by the predetermined distance. As illustrated in FIG. 8B, the image display device 10 and the surrounding vehicle X may respectively display the own-vehicle notification image G1 indicating "prompting for crossing" and the surrounding-vehicle notification image GX indicating "permission to cross", in the substantially identical display form and in the spaced relation by the predetermined distance.

Figure 9A:
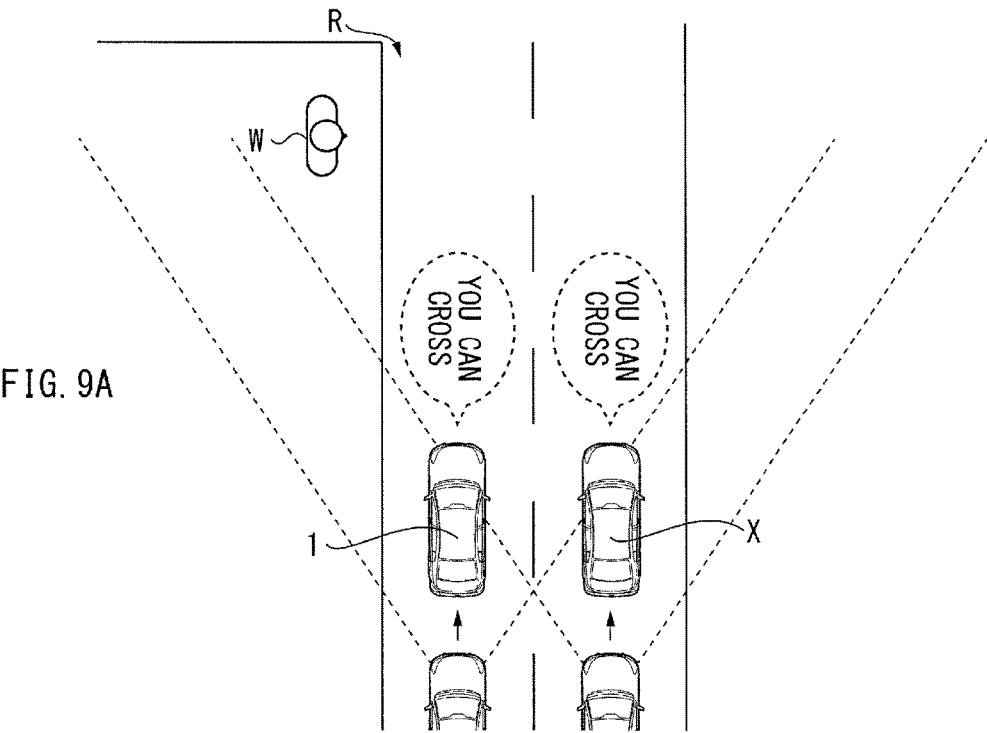
FIG. 9A illustrates the notification image to be displayed by the image display device according to the first implementation of the technology, in a case where the priority level of the own-vehicle notification information is equivalent to the priority level of the surrounding-vehicle notification information, and the own-vehicle notification information and the surrounding-vehicle notification information are substantially identical.
Figure 9B:
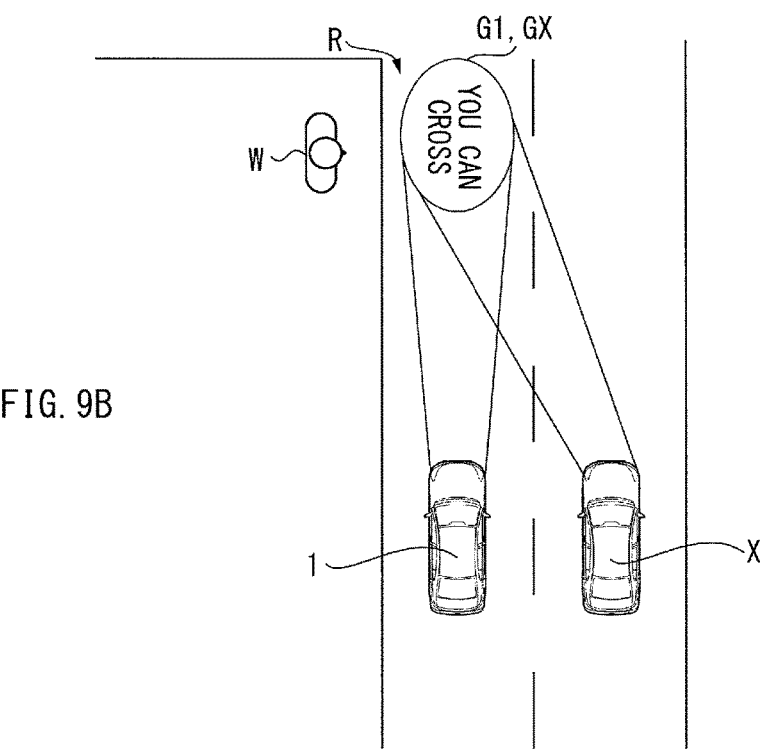
FIG. 9B illustrates the notification image to be displayed by the image display device according to the first implementation of the technology, in the case where the priority level of the own-vehicle notification information is equivalent to the priority level of the surrounding-vehicle notification information, and the own-vehicle notification information and the surrounding-vehicle notification information are substantially identical.

FIGS. 9A and 9B illustrate the notification image G to be displayed by the image display device 10 according to the first implementation of the technology, in the case where the priority level of the own-vehicle notification information is equivalent to the priority level of the surrounding-vehicle notification information, and the own-vehicle notification information and the surrounding-vehicle notification information are substantially identical. FIG. 9A illustrates a state in which the own-vehicle notification information and the surrounding-vehicle notification information have been identified. FIG. 9B illustrates a state in which the own-vehicle notification image G1 and the surrounding-vehicle notification image GX have been displayed in the superimposed relation.

Let us assume that as illustrated in FIG. 9A, the image display device 10 has identified the information indicating "permission to cross" of the priority level B, as the own-vehicle notification information to the pedestrian W. Moreover, let us assume that the surrounding vehicle X has identified the information indicating "permission to cross" of the priority level B, as the surrounding-vehicle notification information to the pedestrian W. The priority level of the own-vehicle notification information is equivalent to the priority level of the surrounding-vehicle notification information. The own-vehicle notification information is substantially identical to the surrounding-vehicle notification information.

In this case, the image display device 10 may transmit, to the surrounding vehicle X, the notification that the own-vehicle notification image G1 and the surrounding-vehicle notification image GX should be displayed as the substantially identical image, in the substantially identical display form, and in the substantially identical display region in the superimposed relation. As illustrated in FIG. 9B, the image display device 10 and the surrounding vehicle X may respectively display the own-vehicle notification image G1 indicating "permission to cross" and the surrounding-vehicle notification image GX indicating "permission to cross", as the substantially identical image, in the substantially identical display form, and in the substantially identical display region in the superimposed relation.

[4. Workings and Effects]

As described, the image display device 10 according to this implementation may decide the display mode of the own-vehicle notification image G1, on the basis of the inter-vehicle communication with the surrounding vehicle X. Accordingly, in the image display device 10 according to the first implementation, it is possible to display the own-vehicle notification image G1, to keep the own-vehicle notification image G1 from interfering with the surrounding-vehicle notification image GX. Hence, in the image display device 10 according to the first implementation, it is possible to notify the notification information important for the target of notification, e.g., the pedestrian W. It is possible to appropriately notify information to the target of notification.

Meanwhile, for example, in the technique as described in JP-A No. 2016-107777, it is not clear how to display an image to be displayed by an own vehicle in a case where a surrounding vehicle also displays an image on a road surface. Accordingly, the technique as described in JP-A No. 2016-107777 involves possibility of overlap or superposition of the display image of the own vehicle on the display image of the surrounding vehicle. Thus, the technique as described in JP-A No. 2016-107777 contributes to possibility that the display image may fail in appropriately notifying information, and give erroneous recognition to a target of notification. In contrast, in the image display device 10 according to this implementation, the display mode of the own-vehicle notification image G1 may be decided on the basis of the inter-vehicle communication with the surrounding vehicle X. This makes it possible to display the own-vehicle notification image G1, to keep the own-vehicle notification image G1 from interfering with the surrounding-vehicle notification image GX. Hence, it is possible for the pedestrian W to appropriately know the notification information important for the target of notification.

In particular, in a case where the notification information is information related to the safety of the target of notification, e.g., the pedestrian W, notifying the notification information to the target of notification appropriately makes it possible for the target of notification to take an action for safety. This makes traffic accidents less likely to occur. In the image display device 10 according to the first implementation, it is possible to appropriately notify information to the target of notification, leading to suppression of occurrence of the traffic accidents.

Furthermore, the image display device 10 according to the first implementation may evaluate the priority levels of the own-vehicle notification information and the surrounding-vehicle notification information, and on the basis of the evaluation result, decide the display mode of the own-vehicle notification image G1. Accordingly, in the image display device 10 according to the first implementation, it is possible to give priority to notifying the target of notification of the notification information important for the target of notification. Hence, in the image display device 10 according to the first implementation, it is possible to notify information to the target of notification more appropriately, leading to further suppression of the occurrence of the traffic accidents.

At this occasion, in the case where the priority level of the own-vehicle notification information is higher than the priority level of the surrounding-vehicle notification information, the image display device 10 according to the first implementation may decide the display mode of the own-vehicle notification image G1, to cause solely the own-vehicle notification image G1 to be displayed, at least while the own-vehicle notification image G1 is being displayed. Moreover, in the case where the priority level of the own-vehicle notification information is lower than the priority level of the surrounding-vehicle notification information, the image display device 10 according to the first implementation may decide the display mode of the own-vehicle notification image G1, to defer displaying the own-vehicle notification image G1, at least while the surrounding-vehicle notification image GX is being displayed. Accordingly, in the image display device 10 according to the first implementation, it is possible to notify, in advance, the target of notification solely of the notification information having a higher priority level. Hence, in the image display device 10 according to the first implementation, it is possible to notify information to the target of notification even more appropriately, leading to the further suppression of the occurrence of the traffic accidents.

Moreover, in the case where the priority level of the own-vehicle notification information is equivalent to the priority level of the surrounding-vehicle notification information, and the own-vehicle notification information is substantially identical to the surrounding-vehicle notification information, the image display device 10 according to the first implementation may decide the display mode of the own-vehicle notification image G1 as follows. The image display device 10 according to the first implementation may decide the display mode of the own-vehicle notification image G1, to cause the own-vehicle notification image G1 and the surrounding-vehicle notification image GX to be displayed as the substantially identical image, in the substantially identical display form, and in the substantially identical display region in the superimposed relation. In other words, the image display device 10 according to the first implementation may be able to cause the own-vehicle notification image G1 and the surrounding-vehicle notification image GX to be on the unitized display. Accordingly, in the image display device 10 according to the first implementation, it is possible to restrain the substantially identical notification information from being displayed in a plurality of display modes, and from giving the erroneous recognition to the target of notification. Hence, in the image display device 10 according to the first implementation, it is possible to notify information to the target of notification even more appropriately, leading to the further suppression of the occurrence of the traffic accidents.

[5. Other Implementations]

Figure 10:
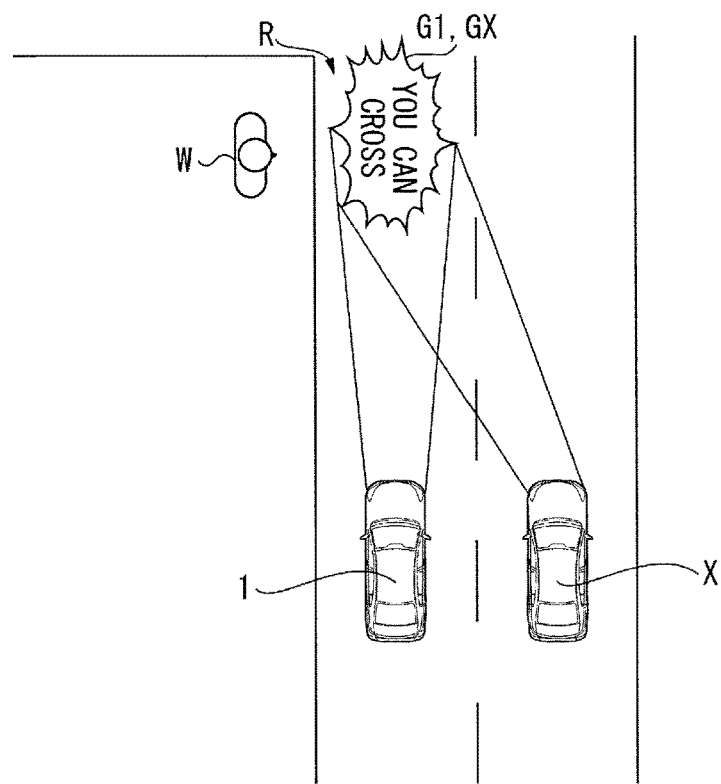
FIG. 10 illustrates a notification image to be displayed by an image display device according to a second implementation of the technology.

FIG. 10 illustrates a notification image G to be displayed by an image display device 10 according to a second implementation of the technology.

In the case where the priority level of the own-vehicle notification information is equivalent to the priority level of the surrounding-vehicle notification information, and the own-vehicle notification information and the surrounding-vehicle notification information are substantially identical, the image display device 10 according to the second implementation may decide the display mode of the own-vehicle notification image G1 as follows. The image display device 10 according to the second implementation may display an image that highlights the own-vehicle notification image G1, in the superimposed relation to the surrounding-vehicle notification image GX, instead of allowing the surrounding vehicle X to display the surrounding-vehicle notification image GX as the substantially identical image to the own-vehicle notification image G1.

Providing that a plurality of vehicles, i.e., the own vehicle 1 and the surrounding vehicle X, identify the substantially identical notification information to the target of notification, e.g., the pedestrian, W, it is plausible that analysis of the state of the target of notification is highly reliable. The own-vehicle notification information and the surrounding-vehicle notification information are, therefore, considered to be appropriate information for the target of notification. Accordingly, in the forgoing case, the image display device 10 according to the second implementation may display the image that highlights the own-vehicle notification image G1, in the superimposed relation to the surrounding-vehicle notification image GX. Hence, in the image display device 10 according to the second implementation, it is possible to effectively notify the target of notification of the more appropriate notification information.

Figure 11:
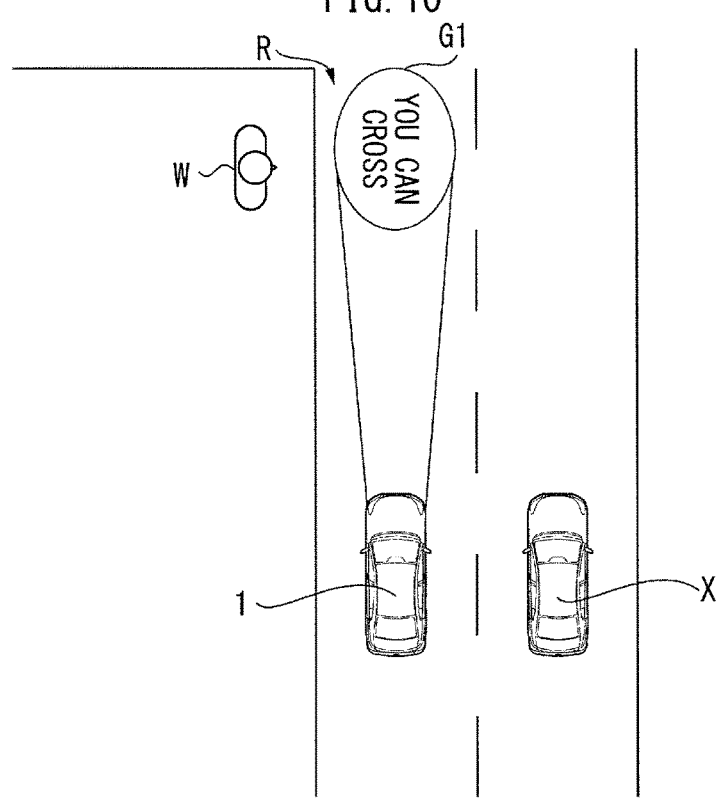
FIG. 11 illustrates a notification image to be displayed by an image display device according to a third implementation of the technology.

FIG. 11 illustrates a notification image G to be displayed by an image display device 10 according to a third implementation of the technology.

In the case where the priority level of the own-vehicle notification information is equivalent to the priority level of the surrounding-vehicle notification information, and the own-vehicle notification information and the surrounding-vehicle notification information are substantially identical, the image display device 10 according to the third implementation may decide the display mode of the own-vehicle notification image G1 as follows. The image display device 10 according to the third implementation may decide the display mode of the own-vehicle notification image G1, to cause any one of the own-vehicle notification image G1 and the surrounding-vehicle notification image GX to be displayed as a representative, as illustrated in FIG. 11, instead of allowing the surrounding vehicle X to display the surrounding-vehicle notification image GX as the substantially identical image to the own-vehicle notification image G1. For example, the image display device 10 according to the third implementation may display the own-vehicle notification image G1 as the representative, and cause the surrounding-vehicle notification image GX to be non-displayed. Hence, in the image display device 10 according to the third implementation, it is possible to restrain the own-vehicle notification image G1 from interfering with the surrounding-vehicle notification image GX, with a more simplified configuration.

FIG. 12 summarizes priority levels of notification information to be evaluated in an image display device 10 according to a fourth implementation of the technology.

In the image display device 10 according to the fourth implementation, the target of notification may be a third-party vehicle other than the own vehicle 1 and the surrounding vehicle X, instead of the pedestrian W. The third-party vehicle may be a following vehicle or an oncoming vehicle of the own vehicle 1. The image display device 10 according to the fourth implementation may evaluate the notification information to the third-party vehicle with reference to safety of the third-party vehicle. The image display device 10 according to the fourth implementation may decide the display mode of the own-vehicle notification image G1 on the basis of the evaluation result.

For example, as illustrated in FIG. 12, the image display device 10 according to the fourth implementation may evaluate information indicating "emergency stop" as the priority level A of the highest priority level. The information indicating "emergency stop" notifies that the own vehicle 1 is going to make an emergency stop. The image display device 10 according to the fourth implementation may evaluate information indicating "warning: accident" as the priority level B of a lower priority level than "emergency stop". The information indicating "warning: accident" notifies a request for careful driving because of occurrence of an accident. The image display device 10 according to the fourth implementation may evaluate information indicating "warning: traffic jam" as the priority level B of the lower priority level than "emergency stop". The information indicating "warning: traffic jam" notifies a request for careful driving because of occurrence of a traffic jam. The image display device 10 according to the fourth implementation may evaluate information indicating "greeting" as the priority level C of the lowest priority level. The information indicating "greeting" notifies a greeting to the third-party vehicle.

In the image display device 10 according to the fourth implementation, it is possible to display the own-vehicle notification image G1, to keep the own-vehicle notification image G1 from interfering with the surrounding-vehicle notification image GX. This makes it possible to appropriately notify the notification information important for the target of notification even in the case where the target of notification is a vehicle. Hence, in the image display device 10 according to the fourth implementation, it is possible to appropriately notify information to the target of notification, leading to the suppression of the occurrence of the traffic accidents.

[6. Et Cetera]

In one implementation of the technology, the image display device 10 may serve as an "image display device". In one implementation of the technology, the own vehicle 1 may serve as a "first vehicle". In one implementation of the technology, the surrounding vehicle X may serve as a "second vehicle". In one implementation of the technology, the road surface R may serve as a "road surface". In one implementation of the technology, the illuminator 20 may serve as an "illuminator". In one implementation of the technology, the detector 30 may serve as a "detector". In one implementation of the technology, the communicator 40 may serve as a "communicator". In one implementation of the technology, the evaluation unit 52 may serve as an "evaluation unit". In one implementation of the technology, the decision unit 53 may serve as a "decision unit". In one implementation of the technology, the display control unit 55 may serve as a "display control unit". In one implementation of the technology, the evaluation unit 52, the decision unit 53, and the display control unit 55 may serve as "circuitry".

The evaluation unit 52, the decision unit 53, and the display control unit 55 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the evaluation unit 52, the decision unit 53, and the display control unit 55. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the evaluation unit 52, the decision unit 53, and the display control unit 55 illustrated in FIG. 2.

It should be appreciated that the forgoing implementations including modification examples may be applied to one another by persons skilled in the art.

The foregoing description is intended to be merely illustrative rather than limiting. It should therefore be appreciated that variations may be made in the implementations of the disclosure by persons skilled in the art without departing from the scope as defined by the appended claims.

The terms used throughout the specification and the appended claims are to be construed as "open-ended" terms. For example, the term "include" and its grammatical variants are intended to be non-limiting, such that recitation of items in a list is not to the exclusion of other like items that can be substituted or added to the listed items. The term "have" and its grammatical variants are intended to be non-limiting, such that recitation of items in a list is not to the exclusion of other like items that can be substituted or added to the listed items.

The invention claimed is:

1. An image display device mounted on an own vehicle traveling on a road, the image display device comprising:
 a controller that:
  detects, using a detector, a notification target around the own vehicle traveling on the road;
  determines a state of the notification target;
  generates, based on the state of the notification target, a first notification to be displayed, by an illuminator of the own vehicle, for the notification target, wherein when the state of the notification target indicates a first state of the notification target, a first type of the first notification is generated, wherein when the state of the notification target indicates a second state of the notification target, a second type of the first notification is generated;
  receives, from a surrounding vehicle via an inter-vehicle communicator, information associated with a second notification to be displayed by an illuminator of the surrounding vehicle for the notification target, wherein the surrounding vehicle is traveling on the road;
  determines a display order of the first notification and the second notification based on a priority level of the first notification and a priority level of the second notification; and
  displays, on a road surface of the road using the illuminator of the own vehicle, the first notification based on the determined display order.

2. The image display device according to claim 1, wherein when the priority level of the first notification is higher than the priority level of the second notification, the controller displays the first notification using the illuminator of the own vehicle before the second notification is displayed using an illuminator of the surrounding vehicle.

3. The image display device according to claim 1, wherein when the priority level of the first notification is lower than the priority level of the second notification, the controller defers displaying the first notification using the illuminator of the own vehicle while the second notification is being displayed using an illuminator of the surrounding vehicle.

4. The image display device according to claim 1, wherein when 1) the priority level of the first notification and the priority level of the second notification are the same and 2)

a content of the first notification is different from a content of the second notification, the first notification is displayed on the road surface using the illuminator of the own vehicle while the second notification is being displayed on the road surface using an illuminator of the surrounding vehicle.

5. The image display device according to claim 4, wherein
the first notification is displayed on a first area of the road surface using the illuminator of the own vehicle, and
the second notification is displayed on a second area of the road surface using the illuminator of the surrounding vehicle, and
the first area is different from the second area of the road surface.

6. The image display device according to claim 1, wherein when 1) the priority level of the first notification and the priority level of the second notification are the same and 2) a content of the first notification is identical to a content of the second notification, the first notification is displayed on the road surface using the illuminator of the own vehicle while the second notification is being displayed on the road surface using an illuminator of the surrounding vehicle.

7. The image display device according to claim 6, wherein the first notification is displayed on a first area of the road surface using the illuminator of the own vehicle while the second notification is being displayed on the first area of the road surface using an illuminator of the surrounding vehicle.

8. The image display device according to claim 6, wherein either 1) the first notification is displayed on a first area of the road surface using the illuminator of the own vehicle or 2) the second notification is being displayed on a second area of the road surface using an illuminator of the surrounding vehicle.

9. The image display device according to claim 1, wherein the state of the notification target is determined based on a position of the notification target relative to the road, a direction to which the notification target is facing, a direction in which the notification target is traveling, or a behavior of the notification target.

10. The image display device according to claim 1, wherein the illuminator includes headlights of the own vehicle.

11. The image display device according to claim 1, wherein the controller determines the priority of the first notification and the priority of the second notification according to a look-up table.

12. The image display device according to claim 1, wherein the information associated with the second notification received from the surrounding vehicle includes the priority of the second notification.

13. The image display device according to claim 9, wherein the state of the notification is further determined based on a road environment surrounding the notification target, and
wherein the road environment includes at least one of a road width of the road, a number of lanes on the road, a road marking on the road, a road sign on the road, and traffic lights on the road.

14. An image display device mounted on an own vehicle traveling on a road, the image display device comprising:
a controller that:
detects, using a detector, a notification target around the own vehicle traveling on the road;
determines a state of the notification target based on a direction to which the notification target is facing;
generates, based on the state of the notification target, a first notification to be displayed, by an illuminator of the own vehicle, for the notification target;
receives, from a surrounding vehicle via an inter-vehicle communicator, information associated with a second notification to be displayed by an illuminator of the surrounding vehicle for the notification target, wherein the surrounding vehicle is traveling on the road;
determines a display order of the first notification and the second notification based on a priority level of the first notification and a priority level of the second notification; and
displays, on a road surface of the road using the illuminator of the own vehicle, the first notification based on the determined display order.

15. An image display device mounted on an own vehicle traveling on a road, the image display device comprising:
a controller that:
detects, using a detector, a notification target around the own vehicle traveling on the road;
determines a state of the notification target based on 1) a road environment surrounding the notification target including at least one of a road width of the road, a number of lanes on the road, a road marking on the road, a road sign on the road, and traffic lights on the road, and 2) at least one of a position of the notification target relative to the road, a direction to which the notification target is facing, a direction in which the notification target is traveling, and a behavior of the notification target;
generates, based on the state of the notification target, a first notification to be displayed, by an illuminator of the own vehicle, for the notification target;
receives, from a surrounding vehicle via an inter-vehicle communicator, information associated with a second notification to be displayed by an illuminator of the surrounding vehicle for the notification target, wherein the surrounding vehicle is traveling on the road;
determines a display order of the first notification and the second notification based on a priority level of the first notification and a priority level of the second notification; and
displays, on a road surface of the road using the illuminator of the own vehicle, the first notification based on the determined display order.

* * * * *